United States Patent
Rodriguez (10) Patent No.: US 12,129,942 B2
(45) Date of Patent: Oct. 29, 2024

(54) FITTING APPARATUS

(71) Applicant: Alberto Rodriguez, Montclair, CA (US)

(72) Inventor: Alberto Rodriguez, Montclair, CA (US)

(*) Notice: Subject to any disclaimer, the term of this patent is extended or adjusted under 35 U.S.C. 154(b) by 24 days.

(21) Appl. No.: 18/101,940

(22) Filed: Jan. 26, 2023

(65) Prior Publication Data

US 2024/0255077 A1    Aug. 1, 2024

(51) Int. Cl.
| | |
|---|---|
| *F16L 19/02* | (2006.01) |
| *F16L 41/02* | (2006.01) |
| *F16L 41/03* | (2006.01) |

(52) U.S. Cl.
CPC ....... *F16L 19/0237* (2013.01); *F16L 19/0225* (2013.01); *F16L 41/021* (2013.01); *F16L 41/03* (2013.01)

(58) Field of Classification Search
CPC ......... F16L 41/02; F16L 41/021; F16L 41/03; F16L 19/0237; F16L 19/062; F16L 31/02; F16L 47/32
See application file for complete search history.

(56) References Cited

U.S. PATENT DOCUMENTS

| | | | |
|---|---|---|---|
| 2,128,720 | A | 8/1938 | Tweedale |
| 5,022,685 | A | 6/1991 | Stiskin |
| 5,104,150 | A * | 4/1992 | Bard ...................... F16L 41/02 |
| 5,135,267 | A * | 8/1992 | Wilson ................ F16L 41/021 |
| 5,411,300 | A * | 5/1995 | Mitsui .................... F16L 31/02 |
| 6,901,967 | B1 | 6/2005 | Kuenzer |
| 7,398,910 | B2 | 7/2008 | Garrison |
| 9,791,083 | B2 | 10/2017 | Gibb |
| D873,389 | S | 1/2020 | Lueng |
| 2008/0277015 | A1* | 11/2008 | Tanaka ................. F16L 41/021 |
| 2008/0277926 | A1* | 11/2008 | Inman, Jr. ............... F16L 47/32 |
| 2013/0062877 | A1* | 3/2013 | Hayashi ................ F16L 41/021 |
| 2013/0181443 | A1 | 7/2013 | Ho |
| 2016/0195208 | A1* | 7/2016 | Cassiday ............... F16L 41/021 |

FOREIGN PATENT DOCUMENTS

| | | | | |
|---|---|---|---|---|
| WO | WO-2013038724 | A1 * | 3/2013 | ............ F16L 41/021 |
| WO | WO2013115963 | | 8/2013 | |

* cited by examiner

*Primary Examiner* — Zachary T Dragicevich (57) ABSTRACT

A fitting apparatus for fluidly coupling a plurality of pipes together includes a flexible bladder which fluidly couples a plurality of pipes together. A rigid shell is positionable around the bladder in an attachment position. The rigid shell comprises two portions which are couplable to each other to position the shell in the attachment position. Collars are provided which threadably attach to the rigid shell.

8 Claims, 7 Drawing Sheets

FITTING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pipe fitting apparatuses and more particularly pertains to a new fitting apparatus for fluidly coupling a plurality of pipes together.

(2) Description of Related Art Including Information Disclosed Under 37 CFR 1.97 and 1.98

The prior art relates to fitting apparatuses which comprise a shell assembled by coupling two portions of the shell around a tube or pipe fitting. The prior art discloses myriad fastening means for coupling the two portions including a sliding engagement, a tongue-and-groove coupling, a weldment, and threaded fasteners which draw the portions toward each other.

BRIEF SUMMARY OF THE INVENTION

An embodiment of the disclosure meets the needs presented above by generally comprising a bladder which is flexible and comprises a plurality of tubes. The tubes are interconnected at a central junction such that the tubes are fluidly coupled to each other. Each tube of the plurality of tubes has a free end which is open. Each tube of the plurality of tubes is configured for receiving an associated pipe of the plurality of pipes through the free end thereof and forming a seal with an outer surface of the associated pipe. A shell is rigid and is positionable in an attachment position around the bladder. The shell comprises a first portion and a second portion which are attachable to each other to position the shell in the attachment position. The attachment position includes the first portion and the second portion being positioned on opposite sides of each tube of the plurality of tubes. Each collar of a plurality of collars is threadably coupled onto each of the first and second portions. Each collar of the plurality of collars corresponds to an associated one of the plurality of tubes and is positioned adjacent to the free end of the associated tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
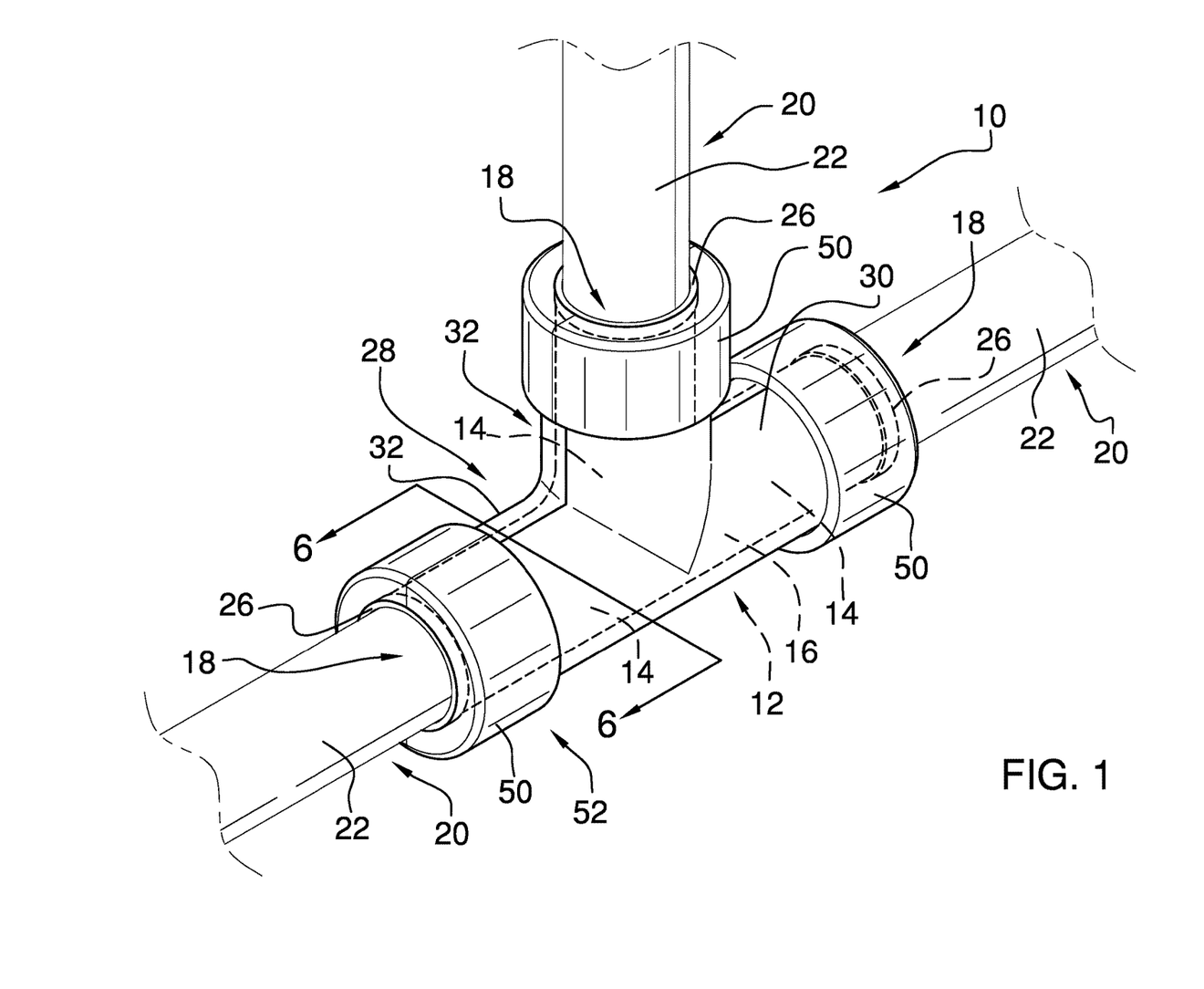
FIG. 1 is a top front side perspective in-use view of a fitting apparatus according to an embodiment of the disclosure.
Figure 2:
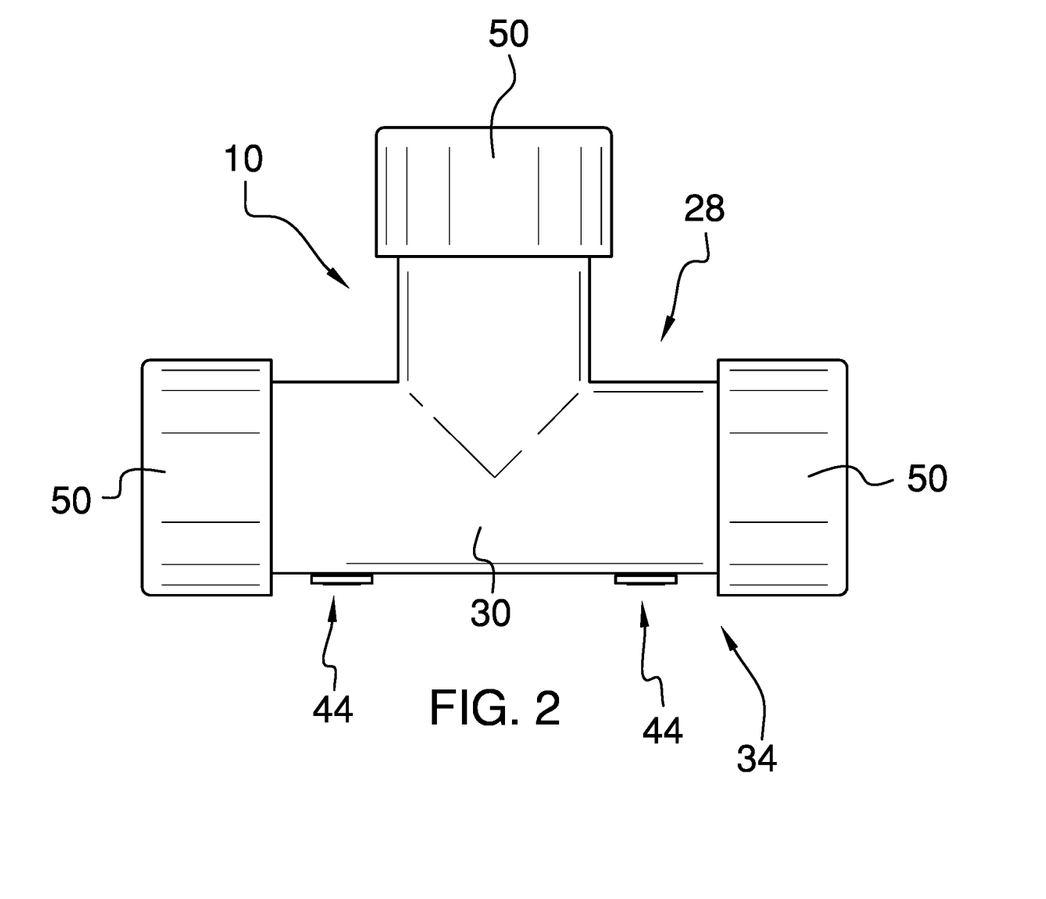
FIG. 2 is a front view of an embodiment of the disclosure.
Figure 3:
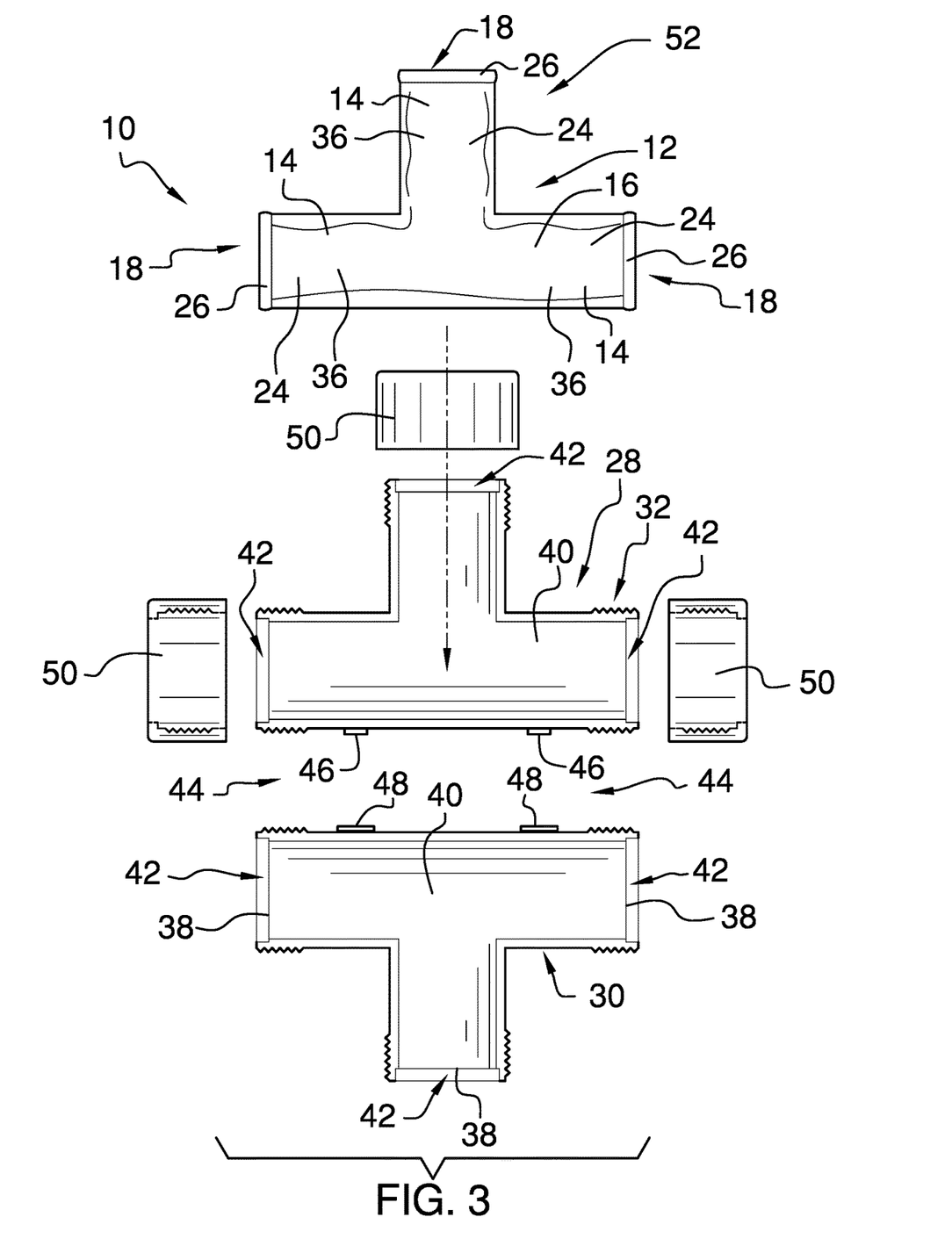
FIG. 3 is an exploded view of an embodiment of the disclosure.
Figure 4:
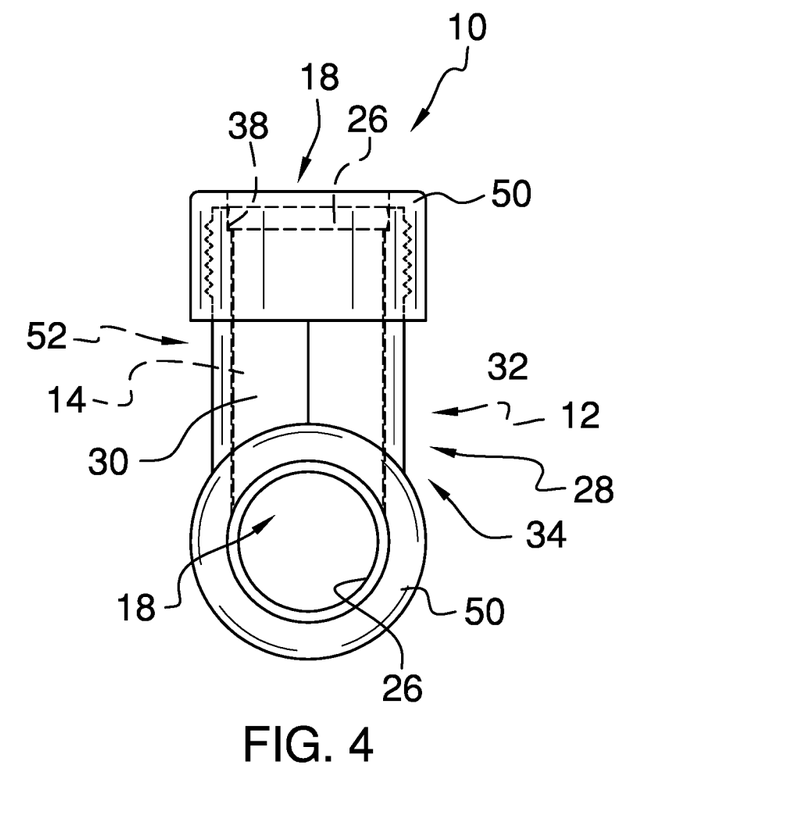
FIG. 4 is a side view of an embodiment of the disclosure.
Figure 5:
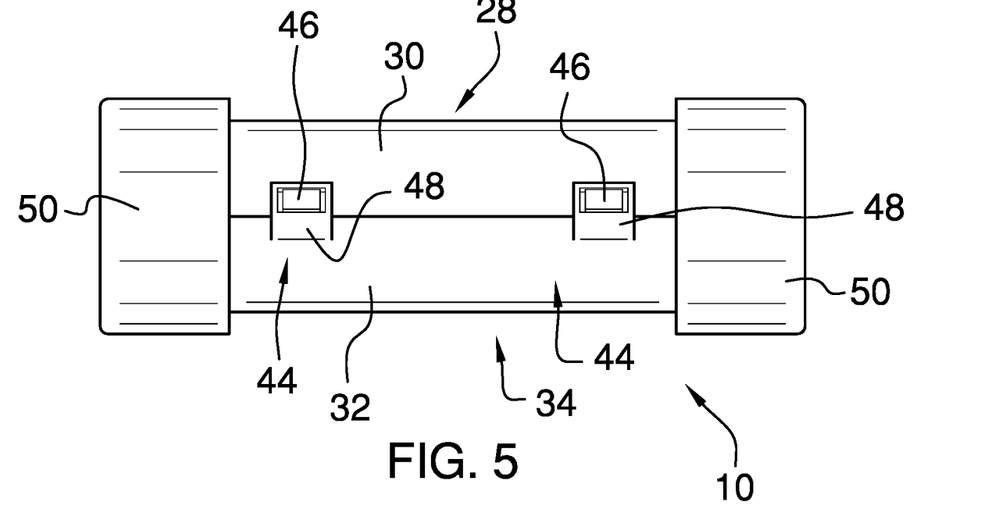
FIG. 5 is a bottom view of an embodiment of the disclosure.
Figure 6:
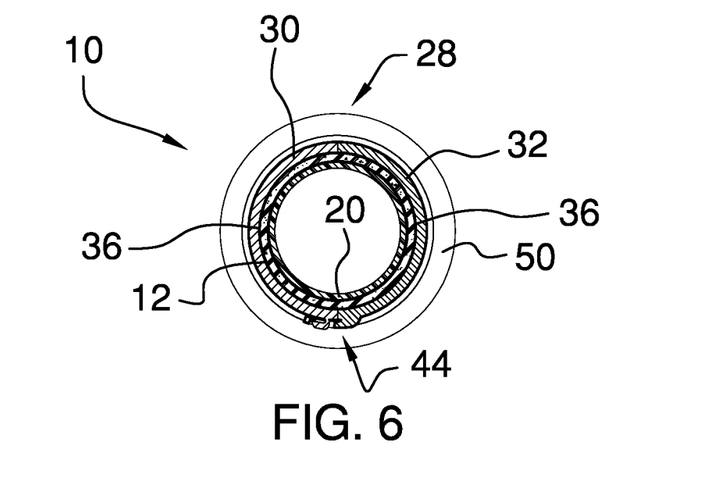
FIG. 6 is a cross-sectional view of an embodiment of the disclosure taken from Arrows 6-6 in FIG. 1.
Figure 7:
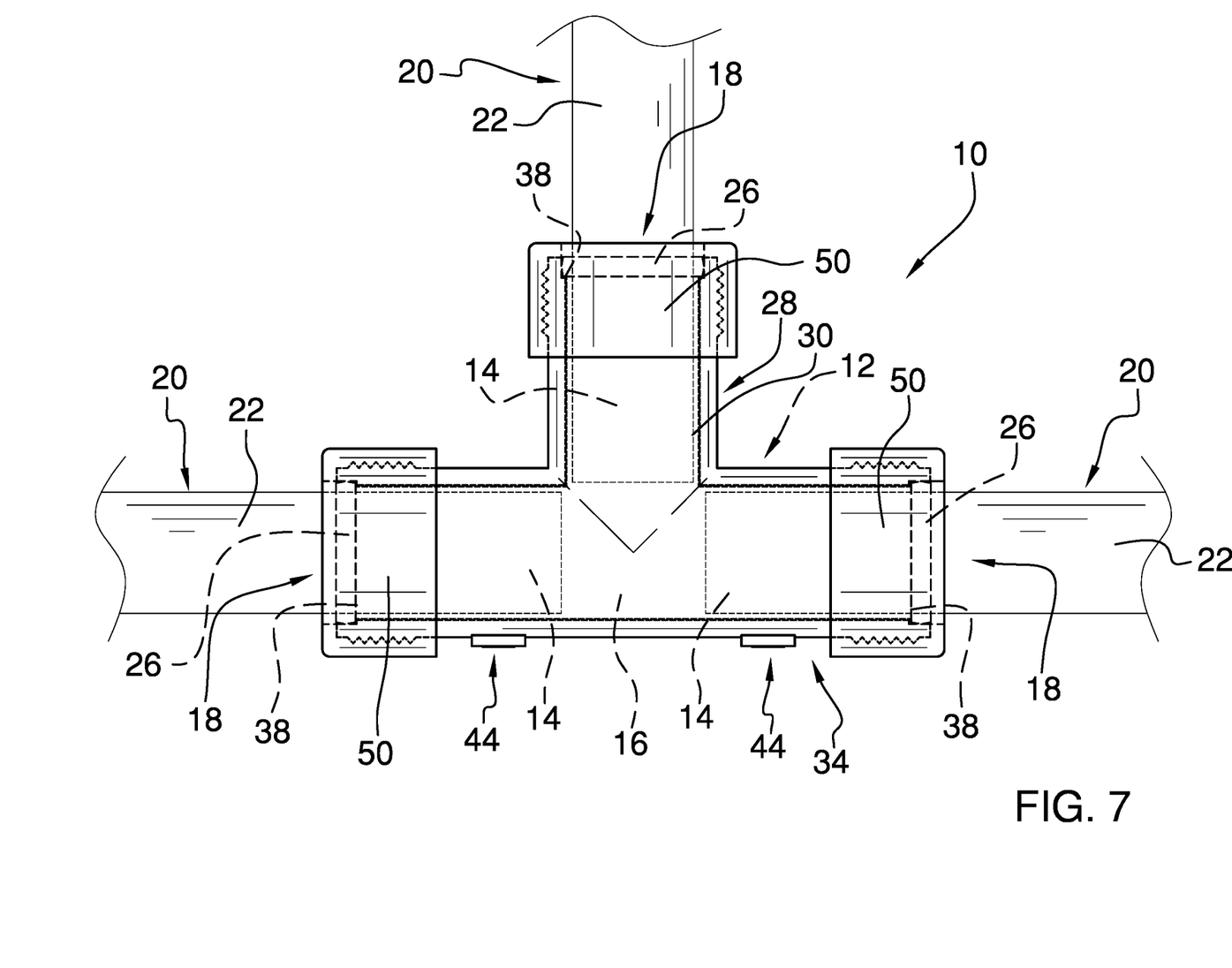
FIG. 7 is a back in-use view of an embodiment of the disclosure.
Figure 8:
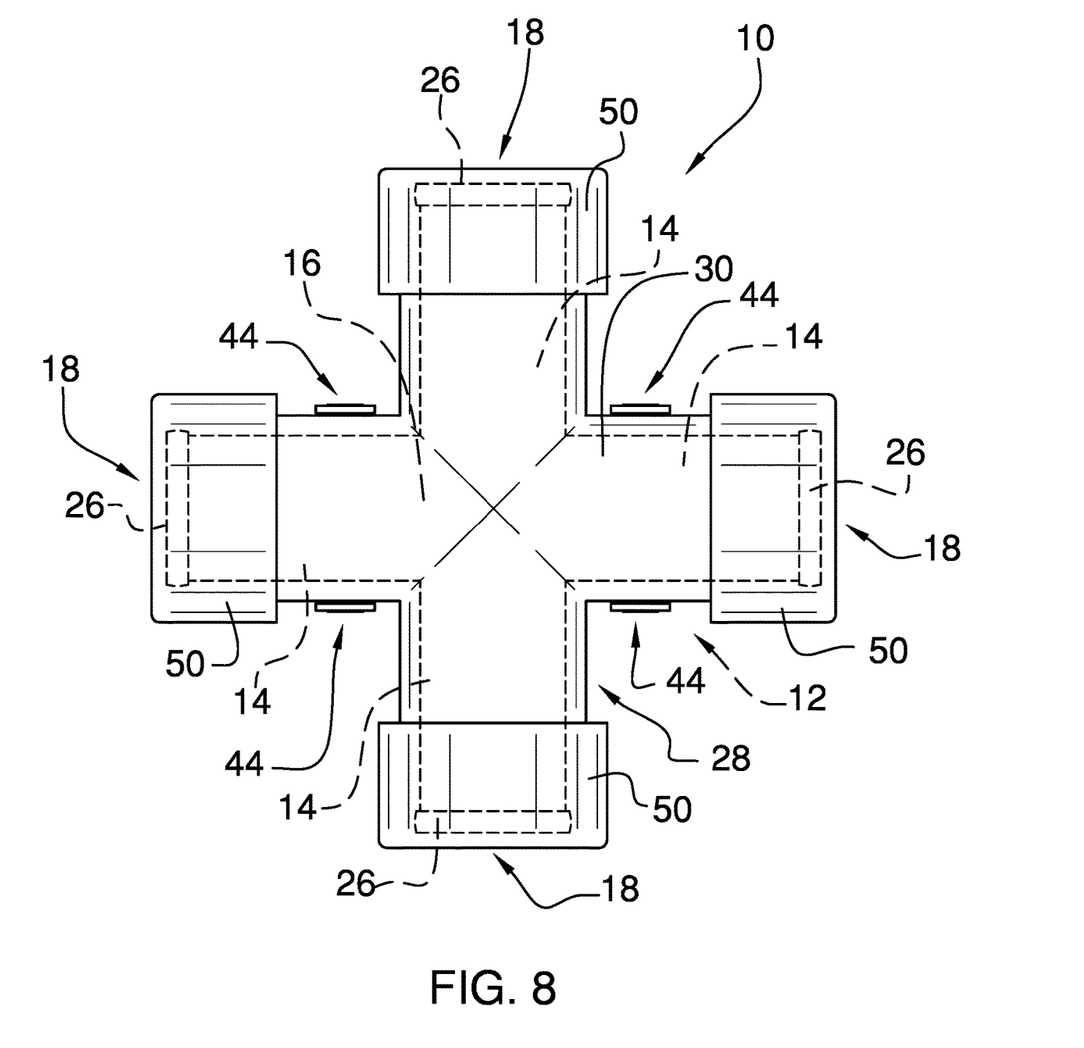
FIG. 8 is a front view of an alternative embodiment of the disclosure.

With reference now to the drawings, and in particular to FIGS. 1 through 8 thereof, a new fitting apparatus embodying the principles and concepts of an embodiment of the disclosure and generally designated by the reference numeral 10 will be described.

As best illustrated in FIGS. 1 through 8, the fitting apparatus 10 generally comprises a bladder 12 which is flexible and comprises a plurality of tubes 14. The tubes 14 are interconnected at a central junction 16 such that the tubes 14 are fluidly coupled to each other. Each tube 14 of the plurality of tubes 14 has a free end 18 which is open. Each tube 14 is configured for receiving an associated pipe 20 of the plurality of pipes 20 through the free end 18 thereof and forming a seal with an outer surface 22 of the associated pipe 20. Each tube 14 of the plurality of tubes 14 also has an outer wall 24 and has a lip 26 positioned at the free end 18 thereof. The lip 26 of each tube 14 of the plurality of tubes 14 is thicker than the outer wall 24 thereof.

A shell 28 is rigid and is positionable in an attachment position 34 around the bladder 12. The shell 28 comprises a first portion 30 and a second portion 32, in which the first portion 30 and the second portion 32 are attachable to each other to position the shell 28 in the attachment position 34.

The attachment position 34 includes the first portion 30 and the second portion 32 being positioned on opposite sides 36 of each tube 14 of the plurality of tubes 14. The shell 28 has a plurality of seats 38 extending into an interior surface 40 of the shell 28. Each seat 38 of the plurality of seats 38 is positioned for seating the lip 26 of one of the plurality of tubes 14 when the shell 28 is positioned in the attachment position 34. Each seat 38 of the plurality of seats 38 is formed by grooves 42 in each of the first and second portions 30, 32.

A locking member 44 is provided for releasably attaching the first portion 30 to the second portion 32 in the attachment position 34. The locking member 44 includes a first mating member 46 mounted on the first portion 30 and a second mating member 48 mounted on the second portion 32, in which the first and second mating member 46, 48 are releasably engaged with each other when the shell 28 is in the attachment position 34. Each collar 50 of a plurality of collars 50 is threadably coupled onto each of the first and second portions 30, 32. Each collar 50 of the plurality of collars 50 corresponds to an associated one of the plurality of tubes 14 and is positioned adjacent to the free end 18 of the associated tube 14. Each collar 50 of the plurality of collars 50 is shaped to be configured for compressing the lip 26 of the associated tube 14 into the associated pipe 20. The lip 26 of each tube 14 of the plurality of tubes 14 is resiliently compressible. Each collar 50 of the plurality of collars 50 may be tapered such that turning of each collar 50 onto the shell 28 progressively compresses the lip 26 of the associated tube 14.

In one embodiment, the plurality of tubes 14 includes three tubes 14 arranged in a T-shape 52. In another embodiment, the plurality of tubes 14 includes four tubes 14 arranged in an X-shape 54.

In use, each collar 50 of the plurality of collars 50 is positioned around one of the plurality of pipes 20. The bladder 12 is positioned to receive each pipe 20 of the plurality of pipes 20 into the free end 18 of a corresponding one of the plurality of tubes 14, fluidly coupling the plurality of pipes 20 together. The first and second portions 30, 32 of the shell 28 are positioned around the bladder 12 such that the shell 28 is positioned in the attachment position 34. The locking member 44 releasably attaches the first portion 30 to the second portion 32 to maintain the shell 28 in the attachment position 34 while the collars 50 are threaded onto the shell 28. The collars 50 compress the lips of the tubes 14 to form seals between each pipe 20 and the bladder 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fitting apparatus for fluidly coupling together a plurality of pipes, the fitting apparatus comprising:
    a bladder being flexible and comprising a plurality of tubes being interconnected at a central junction such that the tubes are fluidly coupled to each other, each tube of the plurality of tubes having a free end being open, each tube of the plurality of tubes being configured for receiving an associated pipe of the plurality of pipes through the free end thereof and forming a seal with an outer surface of the associated pipe, each tube of the plurality of tubes having an outer wall, each tube of the plurality of tubes having a lip positioned at the free end thereof, the lip of each tube of the plurality of tubes being thicker than the outer wall thereof;
    a shell being rigid and being positionable in an attachment position around the bladder, the shell comprising a first portion and a second portion, the first portion and the second portion being attachable to each other to position the shell in the attachment position, the attachment position including the first portion and the second portion being positioned on opposite sides of each tube of the plurality of tubes, the shell having a plurality of seats extending into an interior surface of the shell, each seat of the plurality of seats being positioned for seating the lip of one of the plurality of tubes when the shell is positioned in the attachment position, each seat of the plurality of seats being formed by grooves in each of the first and second portions; and
    a plurality of collars, each collar of the plurality of collars being threadably coupled onto each of the first and second portions, each collar of the plurality of collars corresponding to an associated one of the plurality of tubes, each collar of the plurality of collars being positioned adjacent to the free end of the associated tube.

2. The apparatus of claim 1, further comprising a locking member for releasably attaching the first portion to the second portion in the attachment position, the locking member including a first mating member mounted on the first portion and a second mating member mounted on the second portion, the first and second mating members being releasably engaged with each other when the shell is in the attachment position.

3. The apparatus of claim 1, wherein each collar of the plurality of collars is shaped to be configured for compressing the lip of the associated tube into the associated pipe, the lip of each tube of the plurality of tubes being resiliently compressible.

4. The fitting apparatus of claim 1, wherein the plurality of tubes includes three tubes arranged in a T-shape.

5. The fitting apparatus of claim 1, wherein the plurality of tubes includes four tubes arranged in an X-shape.

6. A fitting apparatus for fluidly coupling together a plurality of pipes, the fitting apparatus comprising:
    a bladder being flexible and comprising a plurality of tubes being interconnected at a central junction such that the tubes are fluidly coupled to each other, each tube of the plurality of tubes having a free end being open, each tube of the plurality of tubes being configured for receiving an associated pipe of the plurality of pipes through the free end thereof and forming a seal with an outer surface of the associated pipe, each tube of the plurality of tubes having an outer wall, each tube of the plurality of tubes having a lip positioned at the free end thereof, the lip of each tube of the plurality of tubes being thicker than the outer wall thereof;

a shell being rigid and being positionable in an attachment position around the bladder, the shell comprising a first portion and a second portion, the first portion and the second portion being attachable to each other to position the shell in the attachment position, the attachment position including the first portion and the second portion being positioned on opposite sides of each tube of the plurality of tubes, the shell having a plurality of seats extending into an interior surface of the shell, each seat of the plurality of seats being positioned for seating the lip of one of the plurality of tubes when the shell is positioned in the attachment position, each seat of the plurality of seats being formed by grooves in each of the first and second portions;

a locking member for releasably attaching the first portion to the second portion in the attachment position, the locking member including a first mating member mounted on the first portion and a second mating member mounted on the second portion, the first and second mating members being releasably engaged with each other when the shell is in the attachment position; and a plurality of collars, each collar of the plurality of collars being threadably coupled onto each of the first and second portions, each collar of the plurality of collars corresponding to an associated one of the plurality of tubes, each collar of the plurality of collars being positioned adjacent to the free end of the associated tube, each collar of the plurality of collars being shaped to be configured for compressing the lip of the associated tube into the associated pipe, the lip of each tube of the plurality of tubes being resiliently compressible.

7. The fitting apparatus of claim 6, wherein the plurality of tubes includes three tubes arranged in a T-shape.

8. The fitting apparatus of claim 6, wherein the plurality of tubes includes four tubes arranged in an X-shape.

\* \* \* \* \*